US007124146B2

(12) United States Patent
Rjaibi et al.

(10) Patent No.: US 7,124,146 B2
(45) Date of Patent: Oct. 17, 2006

(54) INCREMENTAL CARDINALITY ESTIMATION FOR A SET OF DATA VALUES

(75) Inventors: Walid Rjaibi, Thornhill (CA); Peter Jay Haas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/428,191

(22) Filed: Apr. 30, 2003

(65) Prior Publication Data

US 2003/0229617 A1    Dec. 11, 2003

(30) Foreign Application Priority Data

Jun. 10, 2002   (CA)   .................................... 2390350

(51) Int. Cl.
    *G06F 17/00*    (2006.01)
(52) U.S. Cl. .................. 707/102; 707/101; 707/103 R; 707/104.1
(58) Field of Classification Search ...................... None
    See application file for complete search history.

(56) References Cited

U.S. PATENT DOCUMENTS

| 5,542,089 | A | 7/1996 | Lindsay et al. |
| 5,761,653 | A | 6/1998 | Schiefer et al. |
| 5,802,521 | A | 9/1998 | Ziauddin et al. |
| 5,956,706 | A | 9/1999 | Carey et al. |
| 5,995,957 | A | 11/1999 | Beavin et al. |
| 6,282,541 | B1 | 8/2001 | Hoa et al. |
| 6,606,638 | B1 * | 8/2003 | Tarin .......................... 707/200 |
| 2002/0026438 | A1 | 2/2002 | Rjaibi et al. |
| 2002/0046301 | A1 * | 4/2002 | Shannon et al. ............ 709/328 |
| 2002/0065704 | A1 * | 5/2002 | Dunn .......................... 705/26 |

OTHER PUBLICATIONS

Schiefer, Swami A. "On the Estimation of Join Result Sizes," Advances in Database Technology Proceedings, Published: Berlin, Germany, 1994, pp. 287-300.
Bell, Colin; Nerode, Anil; NG, Raymond T.; Subrahmanian, V.S. "Implementing Deductive Databases by Mixed Integer Programming," *ACM Transactions on Database Systems*, vol. 21, No. 2, Jun. 1996, pp. 238-269.
Emiris, Ioannis; Canny, John. "A Practical Method for the Sparse Resultant," 1993 ACM 0-89791-604-2/93/0007/0183.

* cited by examiner

*Primary Examiner*—Sana Al-Hashemi
(74) *Attorney, Agent, or Firm*—Sawyer Law Group LLP (57) ABSTRACT

A technique is provided for incrementally maintaining column cardinality estimates in database management systems. The system catalog table containing a cardinality estimate for a column is extended to include an appropriate data structure. A modified linear counting technique is used in a first embodiment of a method for column cardinality estimation. Moreover, a modified logarithmic counting technique is used in a second, preferred embodiment of a column cardinality estimation method to reduce storage requirements for the data structure. The cardinality estimate is produced by an initial scan of the data but is then further maintained without requiring a full scan of the data. Data changes are reflected incrementally in modifications to the initial cardinality estimate, keeping the cardinality statistics more current with respect to the database condition. The technique of the invention typically provides a capability for a database management system to produce more efficient search plans providing more effective responses to user queries through the use of improved cardinality statistics.

58 Claims, 7 Drawing Sheets

Fig. 2A

| Table 1A Table name Employee | |
|---|---|
| | |
| NAME | SALARY |
| smith | 200,000 |
| jones | 150,000 |
| doole | 80,000 |
| smith | 100,000 |

Fig. 2B

| Table 1B Table name DATABASE SYSTEM CATALOG TABLE | | |
|---|---|---|
| | | |
| TABLE NAME | COLUMN NAME | COLUMN CARDINALITY |
| EMPLOYEE | NAME | 3 |
| EMPLOYEE | SALARY | 4 |

Fig. 2C

| Table 2 A Table name Employee | |
|---|---|
| | |
| NAME | SALARY |
| smith | 200,000 |
| jones | 150,000 |
| doole | 80,000 |
| smith | 100,000 |
| harris | 200,000 |

Fig. 2D

| Table 2B Table name DATABASE SYSTEM CATALOG TABLE | | |
|---|---|---|
| | | |
| TABLE NAME | COLUMN NAME | COLUMN CARDINALITY |
| EMPLOYEE | NAME | 4 |
| EMPLOYEE | SALARY | 4 |

Fig. 2E

| Table 3 Table name DATABASE SYSTEM CATALOG TABLE | | | |
|---|---|---|---|
| TABLE NAME | COLUMN NAME | COLUMN CARDINALITY | COLUMN CARDINALITY ARRAY of COUNTS |
| EMPLOYEE | NAME | 3 adjusted | (0, 2, 0, 1, 1, 0, 0, 0, 0, 0) |

Fig. 2F

| Table 4A Table name DATABASE SYSTEM CATALOG TABLE | | | |
|---|---|---|---|
| TABLE NAME | COLUMN NAME | COLUMN CARDINALITY | COLUMN CARDINALITY ARRAY of COUNTS |
| EMPLOYEE | NAME | 4 adjusted | (0, 2, 0, 1, 1, 0, 0, 0, 0, 1) |

Fig. 2G

| Table 4B  Table name Employee | |
|---|---|
| NAME | SALARY |
| jones | 150,000 |
| doole | 80,000 |
| smith | 100,000 |
| harris | 200,000 |

Fig. 2H

| Table 4C Table name DATABASE SYSTEM CATALOG TABLE | | | |
|---|---|---|---|
| TABLE NAME | COLUMN NAME | COLUMN CARDINALITY | COLUMN CARDINALITY ARRAY of COUNTS |
| EMPLOYEE | NAME | 4 adjusted | (0, 1, 0, 1, 1, 0, 0, 0, 0, 1) |

Fig. 2I

| Table 5A Table name Employee | | |
|---|---|---|
| | | |
| NAME | Hash Value (Binary) | Bit string with only the leftmost 1 |
| smith | 111 | 100 |
| jones | 101 | 100 |
| doole | 011 | 010 |
| smith | 111 | 100 |

Fig. 2J

| Table 5B Table name Employee | | |
|---|---|---|
| | | |
| NAME | Hash Value (Binary) | Bit string with only the leftmost 1 |
| smith | 111 | 100 |
| jones | 101 | 100 |
| doole | 011 | 010 |

Fig. 2K

| Table 5C Table name Employee | | |
|---|---|---|
| | | |
| NAME | Hash Value (Binary) | Bit string with only the leftmost 1 |
| smith | 111 | 100 |
| jones | 101 | 100 |
| smith | 111 | 100 |

INCREMENTAL CARDINALITY ESTIMATION FOR A SET OF DATA VALUES

FIELD OF THE INVENTION

This invention generally relates to determining frequent data values within a set of data values and more particularly to incrementally maintaining statistics such as, column cardinality, in relational database systems.

BACKGROUND OF THE INVENTION

To ensure generation of an efficient query plan, a database management system typically includes a query optimization software module. The query optimization software module generates search plans for query requests based on optimization rules that consider, among many variables, the size of the response set (amount of data expected to be returned) and the number of unique values within the data being queried.

Current, accurate database statistics are highly desired by performance sensitive query software modules (for example, a query optimizer) of database management systems. When database statistics are inaccurate or no longer current, the query optimizer is most likely to generate inefficient query plans. Inefficient query plans perform poorly at run time degrading overall performance of the database management system.

In the following simple examples the actual cardinality value and the estimated cardinality value are equivalent, which may not be the typical case.

Figure 2A:
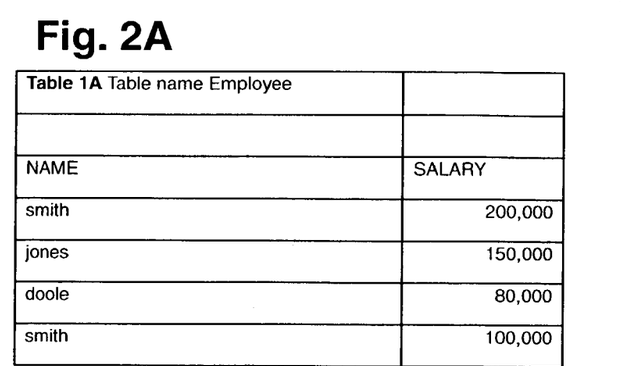
FIGS. 2A through 2K depict sample database tables used in explanatory examples.

Column cardinality is an example of an important database statistic. Column cardinality is a value representing the number of distinct values found in a database column. For example, the column cardinality of the NAME column in Table 1A of FIG. 2A is three, because there are three unique values (names) in the column. Column cardinality statistics (number of unique values within a set of values) are among some of the most commonly required statistics used by a query optimization software module. Column cardinality statistics are used in conjunction with other statistics to compute query plan resource consumption estimates which are then used in determining the most efficient plan for a given query.

Typical database systems estimate column cardinality because exact computation is too expensive in terms of time and resource and due to the dynamic nature of the value. In many commercial database systems, statistics collection is a batch operation, allowing the statistics processing workload to be scheduled based on database performance needs. Typically, database statistics represent a snapshot of the data only for the instant the statistics are generated. As a database table changes, previously computed statistics, associated with that table, may no longer be representative of the current state of the table and its indexes. Statistics for a table should be recalculated to reflect the current state of the table.

It is typically a simple task to incrementally maintain basic statistics such as the total number of rows in a table. However, column cardinality estimates are usually more difficult to maintain. Current techniques for maintaining estimates of column cardinality require rescanning the entire column as the data in that column changes. For example, assume a column "C" initially contains twenty distinct values and subsequently thirty additional distinct values are inserted. Computing a new estimate of column cardinality for column "C" by simply adding the cardinality of the two data sets may lead to an incorrect result due to duplicate entries. An allowance has to be made for duplicate values within the combined set of old and new values.

For example, consider Table 1A (FIG. 2A), EMPLOYEE, containing employee information which has two columns, one being NAME and the other SALARY.

The column NAME has the following four values: "smith", "jones", "doole", and "smith". Observe that the value "smith" is repeated twice, therefore, the estimated column cardinality value of column NAME is equal to "3". This is because there are only three distinct values namely, "smith", "jones", and "doole". On the other hand the estimated column cardinality value of the column SALARY is equal to "4" because all values in this column are distinct.

Figure 2B:
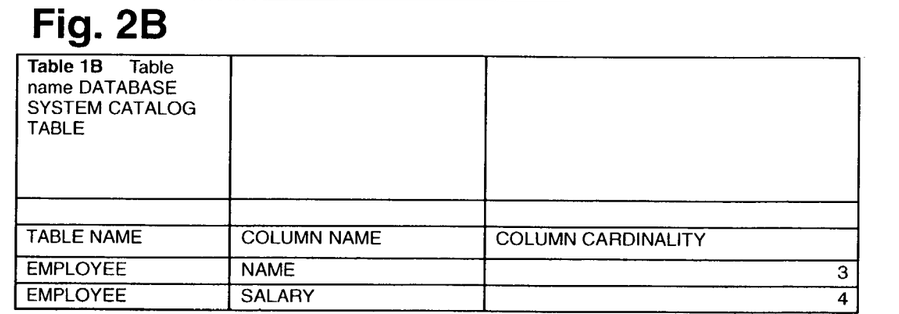

A typical database system has at least one method of computing column cardinality estimates. Typical examples of such methods are Linear counting and Logarithmic counting, both of which are well known to persons of ordinary skill in the art. When a database system computes an estimate of column cardinality, the database system stores the estimated value in what is known as a system catalog table for future use by the database system. For example, in a typical database system, the system catalog table that stores the column cardinality estimates for data in Table 1A of FIG. 2A may be as represented by Table 1B of FIG. 2B.

Table 1B (FIG. 2B), shows the column cardinality estimate of the column NAME belonging to table EMPLOYEE is "3" and the column cardinality estimate of the column SALARY belonging to table EMPLOYEE is "4".

In a typical database system, a query optimizer (a component of the database system) then obtains the values of the column cardinality estimates from a database system catalog table. The query optimizer then uses the column cardinality values along with other statistics when computing the resource consumption estimates for a given set of database queries.

Consider once again the table Employee shown in Table 1A (FIG. 2A). A new row is added to Table 1A (FIG. 2A) to represent an employee called "harris" with a salary "200,000". The updated table Employee is now depicted in Table 2A of FIG. 2C.

Figure 2C:
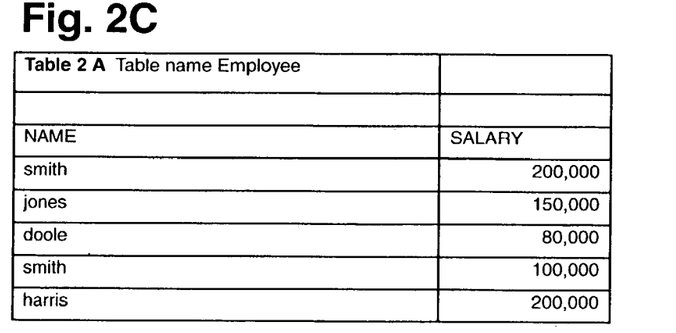

Computing a new column cardinality estimate value for the column NAME for example, according to current methods applied by database systems, requires reading all the NAME values; smith, jones, doole, smith, and harris.

Figure 2D:
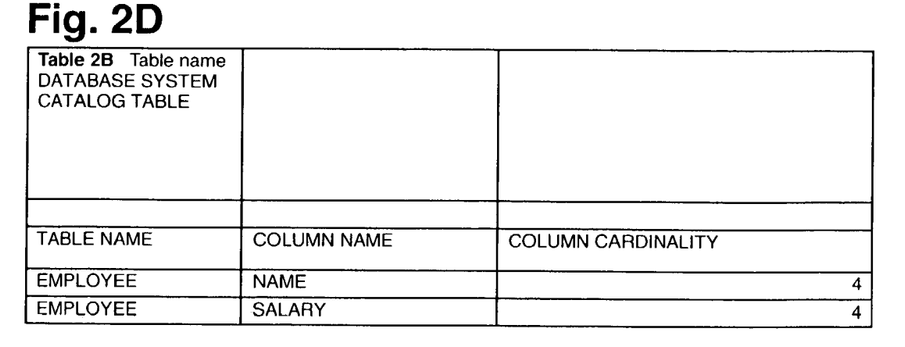

After computing the cardinality estimates for both columns of the recently updated table in Table 2A (FIG. 2C), the database manager updates the system catalog table, as now shown in Table 2B of FIG. 2D.

The content of the database system catalog table in Table 2B (FIG. 2D) indicates that the new column cardinality estimate of the column NAME in table EMPLOYEE is "4"and the new column cardinality estimate of the column SALARY in the same table is "4" as well. Inserting the new row ("harris"), caused the column cardinality estimate of column NAME to change from "3" to "4". The column cardinality estimate of column SALARY did not change, remaining at "4" because the added salary value "200,000" is a duplicate of an existing salary value. In practice, where columns may comprise millions of rows, computing the column cardinality exactly requires too much time and computer memory, and so the column cardinality must be estimated.

In a "linear counting" technique used to estimate column cardinality, a hashing function is used to transform each data value to a bit string that represents a position in a bit map. Initially all positions in the bit map contain zeros. Hashing a data value to a position in the bit map causes a value at the position to be set to one. A value of zero in a position of the bit map indicates there were no data values that hashed to that position. A value of one in a position in the bit map indicates that at least one data value hashed to that position. All data values in the column are hashed, and then the number of distinct data values is estimated by counting the number of bits in the bit map that are set to one (non-zero). Not all data values that hash to the same address are necessarily duplicates. Distinct values that hash to the same location are collisions. Collisions require the count to be adjusted using an adjustment formula, derived using probabilistic techniques (known to those of ordinary skill in the art).

Another well known estimation technique is "logarithmic counting." Although more complicated than linear counting, the bit map used by logarithmic counting is much smaller than that used by linear counting. In logarithmic counting, a hashing function is used to transform each data value to a bit string, which is then further transformed by retaining the leftmost "1" position and converting all remaining positions to "0". All data values in the column are doubly transformed to bit strings in this manner, and a final bit map is computed as the bit-wise "OR" of all the bit strings for the column. The leftmost "0" position in the final bit map is then computed, and this relative position number n is used to calculate the estimated cardinality value using the formula 2n/q, where "q" is set to a value "0.7735". This latter expression is a well known probabilistic estimation formula that ensures statistically reasonable results.

As can be seen from the foregoing discussion, current cardinality estimation techniques typically require all data values in a column to be obtained each time a new estimate of that column's cardinality is requested. The detailed example shown previously illustrates a case where a new value was added, but the same requirement also holds for cases where an existing value is deleted or updated. The presence of duplicate entries in columns of data make it difficult to maintain the column cardinality estimates each time data values change. It is apparent, from the examples described, that there is a need for improved efficiency, or expediency or both regarding generation of database management systems statistics.

DESCRIPTION OF THE DRAWINGS

Embodiments of the current invention are described by way of example, in the accompanying drawings in which.

SUMMARY OF THE INVENTION

The present invention provides a technique for incrementally updating or maintaining column cardinality estimate values in database management systems. The invention extends the system catalog table storing a column cardinality estimate to also include an appropriate data structure associated with the column for which cardinality is being maintained. The data structure consists of an array of counts, where the interpretation of the counts depends on the particular embodiment. The invention uses the information in the extended data structure in conjunction with a modified counting technique and is suitable for use in database management systems requiring current column statistics.

In a first aspect of the invention there is provided a method performed on a computer system for estimating a cardinality value for a set of data values comprising, initializing a data structure for representing counts, obtaining a data value from the set of data values and transforming the data value into a transformed string. Next modifying the data structure with the transformed string and obtaining a summary statistic value from said modified data structure. Finally generating an estimated cardinality value using the summary statistic value.

In a another aspect of the invention there is provided a computer system for estimating a cardinality value for a set of data values comprising, means for initializing a data structure for representing counts, means for obtaining a data value from the set of data values and means for transforming the data value into a transformed string. In addition, providing means for modifying data structure with the transformed string, and means for obtaining a summary statistic value from the modified data structure. Additionally, providing means for generating an estimated cardinality value using the summary statistic value.

In a further aspect of the invention there is provided an article comprising, a computer readable signal bearing medium with means stored in the medium for initializing a data structure for representing counts, means stored in the medium for obtaining a data value from a set of data values, and means stored in the medium for transforming the data value into a transformed string. The article further provides means stored in the medium for modifying the data structure with the transformed string, and means stored in the medium for obtaining a summary statistic value from the modified data structure. In addition, the article provides means stored in the medium for generating an estimated cardinality value using the summary statistic value.

Other features and advantages of the current invention should be apparent from the following description of embodiments, which illustrates, by way of example, the principles of the invention.

DETAILED DESCRIPTION

In the performance of database query processing, knowledge of column cardinalities (the number of distinct values in a column) is important for the generation of efficient query plans. The query plans used in query operations directly affects the performance of the relational database management system.

The current invention typically enables a database management system to more efficiently compute, when required, a column cardinality estimate without requiring use of all of the column data values. Computation may occur whenever a new data value is inserted into a column or an existing data value is deleted from, or updated in, a column. The invention determines the new estimated column cardinality value using the new data value inserted, deleted or updated. This method of estimation is referred to as "incremental column cardinality maintenance". The invention incorporates, in a first embodiment, a modified linear counting technique into computing a column cardinality estimate. The invention incorporates, in a second, preferred embodiment, a modified logarithmic counting technique. This technique may be used when computing a column cardinality estimate, to reduce storage requirements of the system catalog table data structure.

Figure 1:
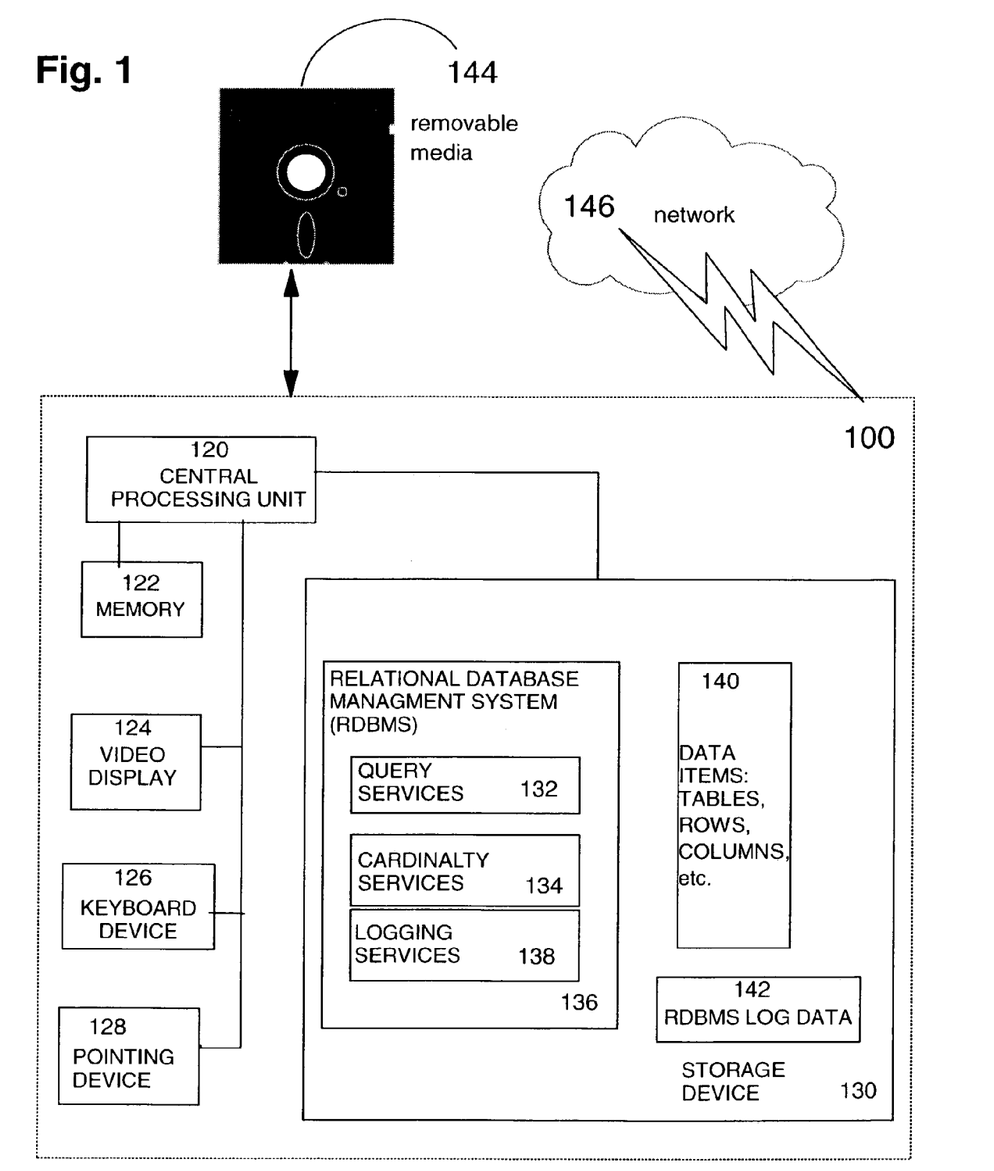
FIG. 1 is a block diagram showing a data processing system incorporating an embodiment of the invention.

Referring to FIG. 1 a data processing system 100 is shown incorporating a database management system 136 containing an embodiment of the present invention. The example shown using a database management system is illustrative of an embodiment of the invention only and does not limit the applicability of the invention that would be appreciated by those of ordinary skill in the art. For example, the invention may be used elsewhere such as with flat files and hierarchical databases and in differently configured data processing systems (simply referred to as computer systems as well).

Data processing system 100 comprises central processing unit 120, memory 122, videos display 124, keyboard 126, pointing device 128, storage device 130, (which may be disk or tape or other suitable device for data storage), removable media 144 and network 146. One of ordinary skill in the art will recognize data processing system 100 as a general purpose digital computer.

Relational database management system 136, as shown, comprises a software module that is stored on and loaded from storage device 130. While only one system is depicted, it is well known that the data and database management system may be maintained in other embodiments such as combining or connecting different systems by network 146. Relational database management system 136 comprises functional modules such as query services 132, cardinality services 134 and logging services 138. Data items 140 may be rows, columns, tables, associated with and used by, the relational database management system 136.

Data items 140 and RDBMS log data 142 typically include textual data comprised of character strings that may or may not be numeric. Data items 140 and RDBMS log data 142 may also include other uniquely identifiable objects and may be stored on the same storage device 130 or other storage means such as removable media 144. Cardinality services 134 generates, stores and maintains column cardinality statistics associated with specified data values (data items 140 and RDBMS log data 142). Column cardinality statistics generated by cardinality services 134 are then used for query optimization by the query services 132 to build and run query plans. Logging services 138 captures information related to specific database events and records such information in RDBMS log data 142 for subsequent uses such as transaction recovery, reporting or other processing.

Figure 3:
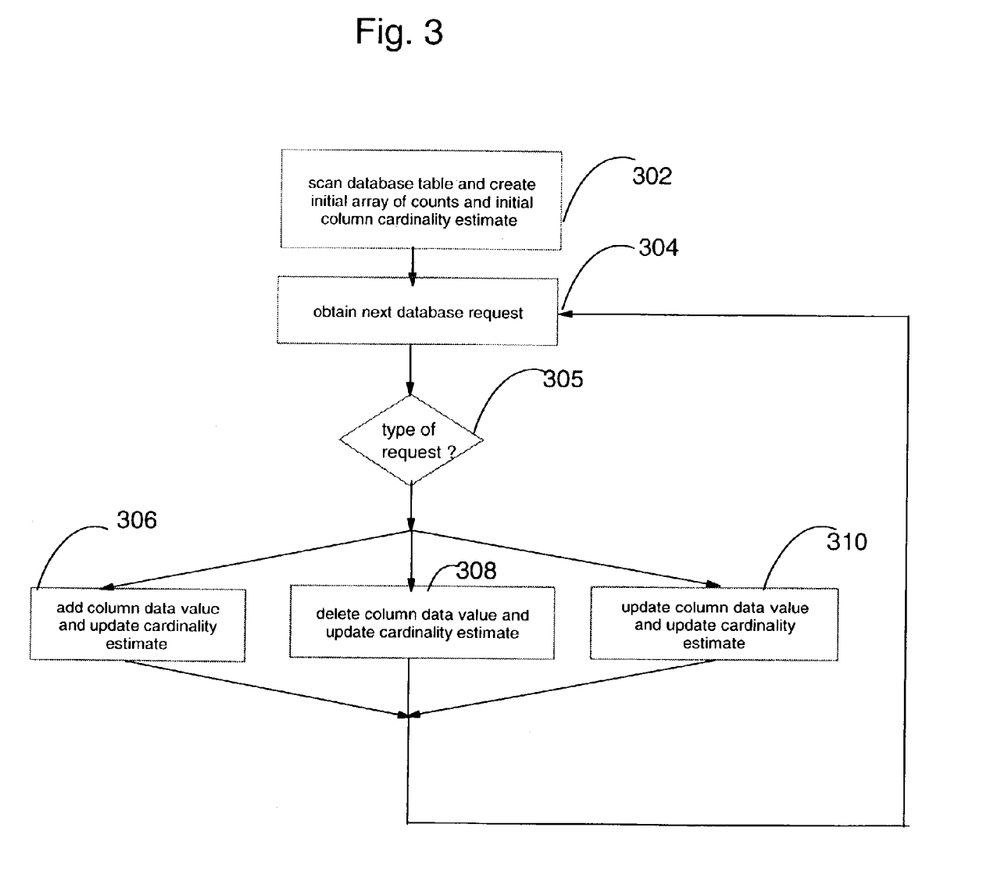
FIG. 3 is a flow diagram showing a view of the column cardinality estimation process used in embodiments of the current invention in FIG. 1.

FIG. 3 illustrates an example of cardinality services 134 of FIG. 1 used in both embodiments of the invention. Cardinality services 134 (FIG. 1) begins with operation 302 in which the database column is scanned, an initial array of counts is created and initialized to zeros, and an initial column cardinality estimate is obtained. Upon completion of operation 302, the cardinality services 134 process moves to operation 304. A database operation request is obtained from the database management system 136 during operation 304. During operation 305 the next operation is selected depending upon the type of request; INSERT select 306, DELETE select 308 or UPDATE select 310. During operation 306, the column data value is added and the column cardinality estimate is updated. During operation 308, the column data value would be deleted and the column cardinality estimate updated. During operation 310 the column data value would be updated and the column cardinality estimate would be calculated again as well.

After performing any one of the operations 306, 308, or 310, cardinality services 134 returns to operation 304 to obtain the next database request. It is important to note cardinality services 134 does not revert to operation 302 during which a complete database column scan is performed. In a first embodiment of this invention, a modification of linear counting technique is used to update the cardinality estimate in operations 306, 308, and 310, and in a preferred embodiment a modification of logarithmic counting technique is used in these operations. Further detail of the process in FIG. 3 will now be described using FIGS. 4, and 5.

Figure 4:
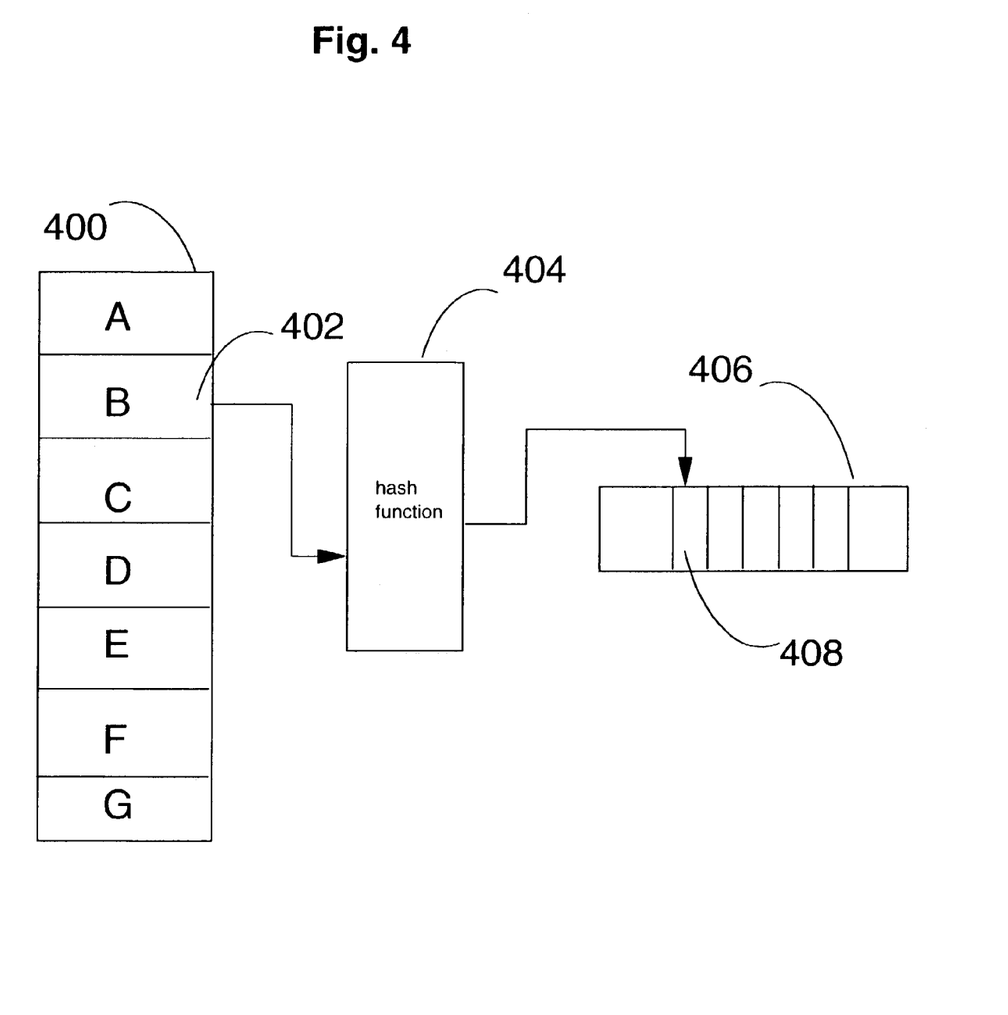
FIG. 4 is a block diagram showing a view of the column cardinality estimation process in an embodiment of the invention of FIG. 3.

Referring to FIG. 4, a first embodiment of the present invention extends the linear counting technique to update the cardinality estimate in operations 306, 308, and 310 in FIG. 3. Instead of maintaining a bit map, that only indicates the absence or presence of a value, the embodiment extends the system catalog table where column cardinality is stored to include an array of counts associated with each column (see Table 3 of FIG. 2E). Using the technique of this invention, an element in the array of counts is either zero, (which indicates no data values hashed to the element), or "N", (indicating there were "N" data values that hashed to the element position). The array of counts provides a capability to store the result of data value changes. The capability of performing incremental maintenance of column cardinality estimates is then provided through the use of the counts.

At an instant in time, the mth entry of the array of counts records the number of data values in a column that have hashed to position m. Column cardinality is then estimated as the number of non-zero entries in the array of counts adjusted for collisions using the same adjustment formula as the simple linear counting mechanism. The number of non-zero entries may be referred to as a summary statistic derived from the array of counts. The unadjusted count may be referred to as the "raw" column cardinality estimate while the adjusted count is referred to as the "final" column cardinality estimate. Handling of INSERT, DELETE, and UPDATE database operations using modified linear counting is described below.

In a database INSERT operation, a new value 402 inserted into the set of data values 400, is hashed by hashing function 404 to a position 408 in array of counts 406, and the value at position 408 is incremented by one. If the entry was equal to zero prior to being incremented, then the new data value is in fact a new distinct value, the raw column cardinality estimate is incremented by 1 and the final column cardinality is recalculated. If the entry was greater than zero prior to being incremented, then the new value is assumed to be a duplicate of a previous distinct value. In this case both the raw and final column cardinality estimates remain unchanged.

In a database DELETE operation, a data value to be deleted from the set of data values 400 is hashed by hashing function 404 to a position 408 in array of counts 406, and the value at position 408 is decremented by one. Observe that the entry at this position was positive prior to being decremented, since the count at the relative position in the array of counts 406 was previously incremented when this value (or a duplicate of it) was inserted. If the count is zero after being decremented, the raw column cardinality estimate is decremented by one and the final column cardinality is recalculated. Otherwise, the raw and final column cardinality estimates remain unchanged retaining their previous values.

A database UPDATE operation can be thought of as deleting the old value followed by inserting the new value.

The operations in the delete and insert steps can then be applied sequentially as explained above.

Figure 2E:
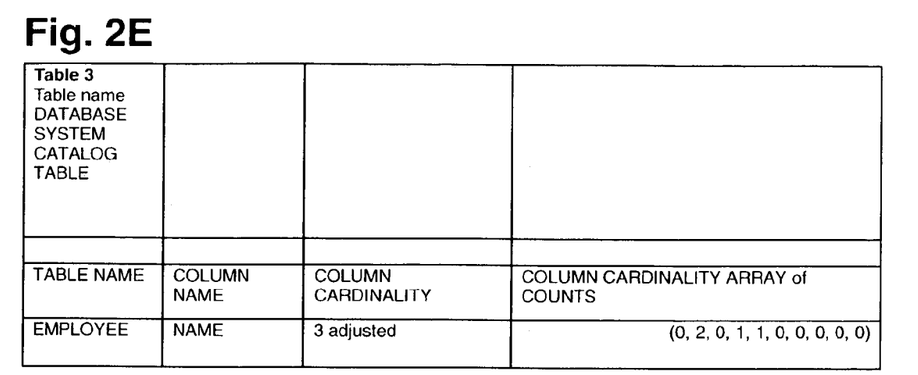

For example, consider Table 1A (FIG. 2A), applying the above described operation enabling aspects of the present invention to compute the cardinality of the column called NAME for the first time results in the output shown in the database system catalog table depicted in Table 3 of FIG. 2E. To keep the example simple, array of counts 406 as illustrated in Table 3 (FIG. 2E) contains only 10 elements, but it is understood that it can contain as many elements as desired. Array of counts (0, 2, 0, 1, 1, 0, 0, 0, 0, 0) indicates no data values in column NAME have hashed to positions 1, 3, 6, 7, 8, 9, 10, while two data values from the column hashed to position two. According to Table 1A (FIG. 2A), this value must have been the value "smith". A single value hashed to positions 4 and 5 in the array of counts 406.

Figure 2F:
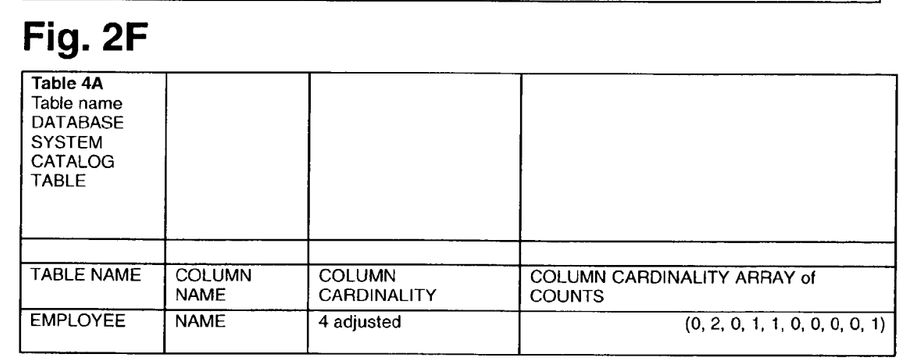

As in the standard linear counting technique, the column cardinality estimate of column NAME, in Table 1A (FIG. 2A), is equal to the number of elements in the array whose content is non-zero. It is easy to see then that there are three elements. Therefore, the column cardinality is set to three (and then adjusted for collisions as before) as shown in the database system catalog of Table 3 (FIG. 2E). Assume a new row is added into this table (via an INSERT) to represent an employee with a unique (previously nonexistent) name. To determine the new estimate of column cardinality, cardinality services 134 hashes the new unique value to a position in the array of counts 406 and increments the count at that position by one. In this example, assume the new unique value is "harris" (see Table 2A of FIG. 2C), hashed to position 10 causing array of counts 406 to be (0, 2, 0, 1, 1, 0, 0, 0, 0, 1). The new estimated value of column cardinality is computed by counting the number of non-zero elements in the array of counts 406. It is easy to see that there are now 4 elements. The database system catalog table is now depicted in Table 4A of FIG. 2F.

Figure 2G:
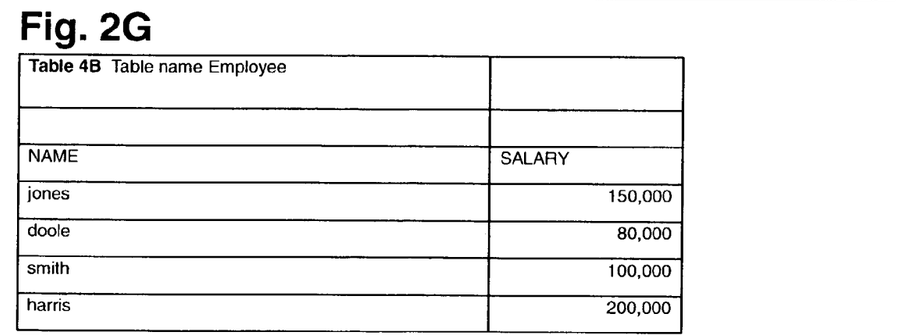
Figure 2H:
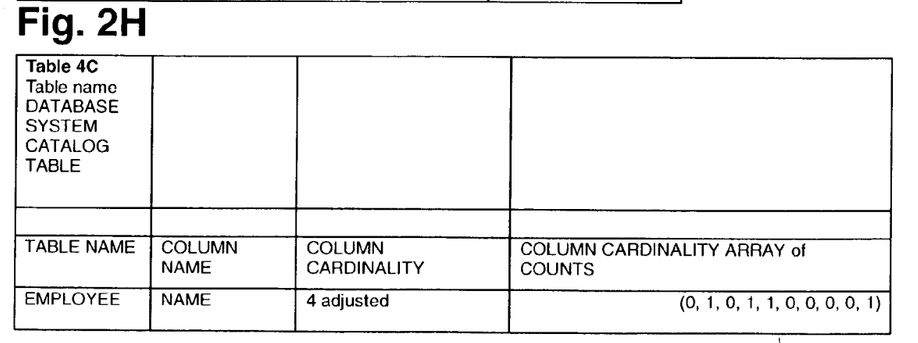

Now assume a previous employee (for example, an entry in column 400 of FIG. 4) is deleted (database DELETE operation). Assume it is the employee "smith" that is deleted from Table 2A (FIG. 2C) causing the table to be now depicted in Table 4B of FIG. 2G. Cardinality services 134 hashes the deleted value "smith" to a position in the array of counts 406 and decrements the count at that position by one. Observe that this position must have been position two because "smith" is the only name to occur twice in Table 2A (FIG. 2C). Array of counts 406 is now (0, 1, 0, 1, 1, 0, 0, 0, 0, 1). The new estimated value of the column cardinality is again computed by counting the number of non-zero elements in array of counts 406. It is easy to see that there are still 4 elements. Column cardinality did not change because the data value deleted was simply a duplicate. The database system catalog table now looks like Table 4C (FIG. 2H).

An UPDATE operation can be thought of as a DELETE of the old value followed by an INSERT of the new value. This embodiment of the invention computes a new column cardinality estimate value after an update operation, by sequentially performing the logic for a delete of the old value followed by an insert of the new value. An example of an update is not shown as this is easily understood from the previous insert and delete examples.

Figure 5:
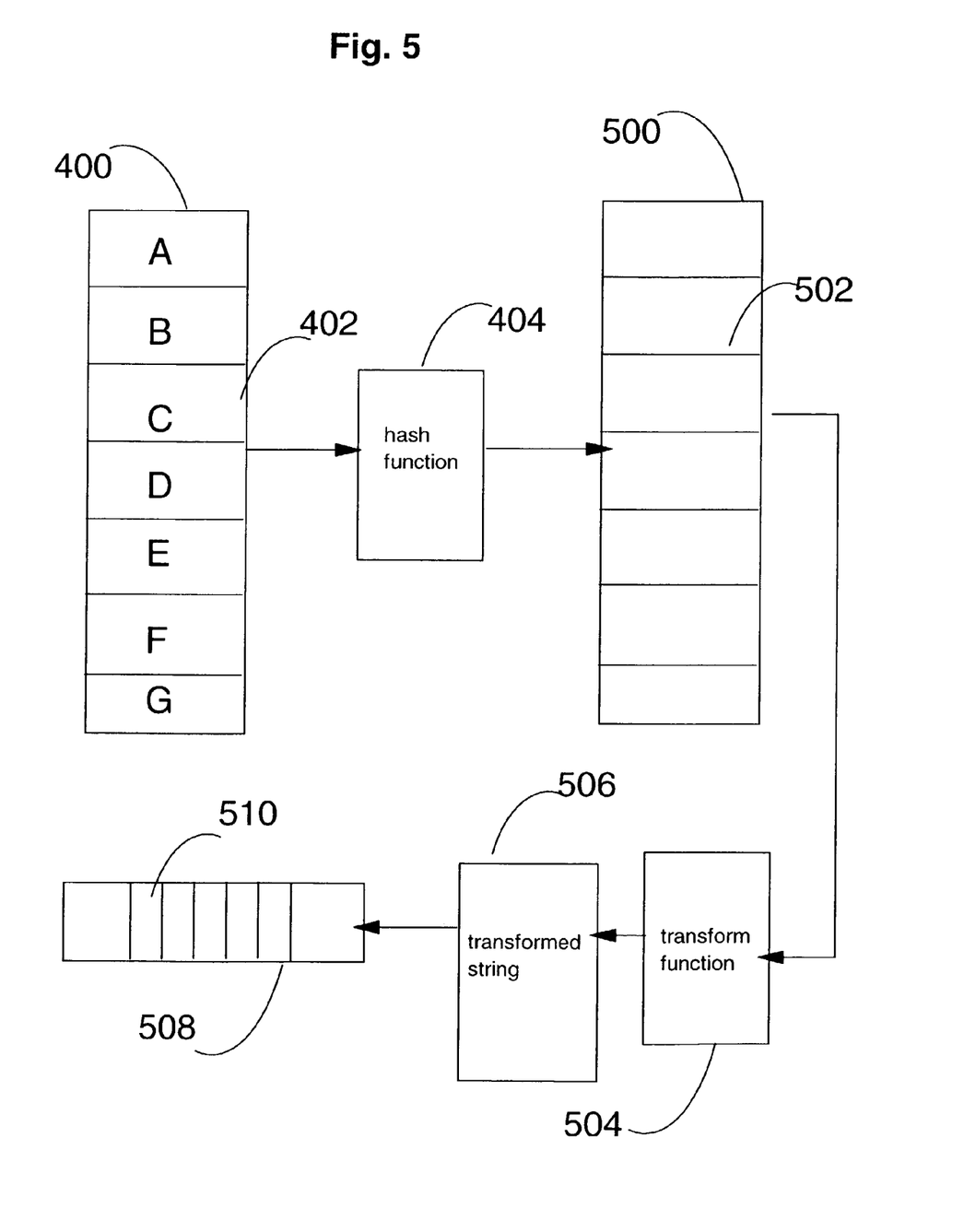
FIG. 5 is a block diagram showing a view of the column cardinality estimation process in a preferred embodiment of the invention of FIG. 3.

Referring to FIG. 5, a second, preferred embodiment of the present invention extends the logarithmic counting technique to update the cardinality estimate in operations 306, 308, and 310 in FIG. 4. As with the first embodiment, the preferred embodiment extends the system catalog table where column cardinality is stored to include an array of counts associated with each column (rather than a bit map as in the standard logarithmic counting technique). Beginning with a set of data values 400 (in FIG. 4), a value such as value 402 is obtained and hashed using a hashing function 404 creating a bit string 502 that is placed into a collection of such strings 500. Each bit string, such as 502, is then transformed through transform function 504 retaining the leftmost "1" position in string 502 (and setting all other positions to "0") to produce a transformed string 506. Transformed string 506, viewed as a vector of 0's and 1's, is then added to (or subtracted from, as dictated by the associated database operation) the array of counts 508. The nth position in the array of counts 508, position 510, indicates the leftmost "0" position. Position numbers begin at "0" starting at the leftmost element in the array of counts 508. The relative position number n, (and not the value at that position) is used to calculate the estimated cardinality value using a formula 2n/0.7735. The relative position number n may be referred to as a summary statistic derived from the array of counts. It may also be appreciated that storage of individual bit strings (such as bit string 502) into collection 500 may not be required. Individual bit strings (such as bit string 502) can be transformed, updating the array of counts 508 on a continuing running count or incremental basis, thereby reducing the storage required.

For example, assume "C" (data value 302 of FIG. 5) is hashed to become bit string 502 having a binary value "1101". String 502 is then transformed into bit string 506 having a binary value "1000" (having a leftmost "1" retained). Value "1000", viewed as a vector (1,0,0,0), is added to (or subtracted from) the array of counts 508 using simple vector addition (or subtraction), thereby causing the value (count) at exactly one position in the array to be incremented (or decremented). A new cardinality estimate needs to be calculated only if the value of at that one position (such as 510) changes (where a change means go to zero, go to one from zero) as a result of the previous addition or subtraction operation. Transformation of the bit string may be implemented more efficiently by simply computing the position m of the leftmost "1" in the initial bit string and then incrementing or decrementing the count in position m of the count array by one.

Operation 306 (of FIG. 3) of cardinality services 134 (FIG. 1) is performed to compute the estimate of column cardinality when a new data value has been added to a set of values for which a cardinality estimate is required. During hashing operation 404 (of FIG. 4) a data value 402 is hashed to create a bit string. Upon completion of operation 404, cardinality services 134 begins operation 504 (of FIG. 5). During operation 504, the position of the leftmost "1" in the bit string is determined and maintained, all other positions in the bit string being set to zero, creating a transformed bit string. The transformed bit string is added to array of counts 508 (of FIG. 5) causing a counter in position m to be incremented by one. Cardinality services 134 next determines a position n of the leftmost zero entry in the array of counts. If, prior to being incremented, position n, was the leftmost zero entry in array of counts 508, the column cardinality estimate is updated to a new value. Otherwise, the column cardinality estimate retains its previous value. When required, and using the value n, the new estimated column cardinality value is determined using a formula 2n/q. The process is typically repeated using multiple hash functions (on the order of 64) and the resulting column cardinality estimates averaged to create a final estimate.

Operation 308 (of FIG. 3) of cardinality services 134 (FIG. 1) is performed to compute the estimate of column cardinality when a data value has been deleted from the set of data values. During hashing operation 404 (of FIG. 4) the data value being deleted is hashed to create a bit string. The position, m, of the leftmost "1" in the bit string is then determined during operation 504 as before, but the transformed bit string is subtracted from array of counts 508 (of FIG. 5) causing a counter in position m to be decremented by "1". (Note: the entry in position m is positive prior to being decremented.) Cardinality services 134 next determines a position n of the leftmost zero entry in the array of counts. If, after being decremented, the entry in position m is now the leftmost zero entry in array of counts 508, then the column cardinality estimate is updated to a new value. Otherwise, the column cardinality estimate retains its previous value. Using the value n, the estimated column cardinality value is determined using a formula $2n/q$. The process is typically repeated using multiple hash functions (on the order of 64) and the resulting column cardinality estimates averaged to create a final estimate.

It should be reemphasized that although not shown in the diagram one need only compute a new estimate for the column cardinality if the position n of the leftmost "0" in the array of counts has changed after the database operation of INSERT, DELETE or UPDATE. If the value for n has not changed, the previously computed estimate is retained and used as the estimated cardinality value, saving time and resource.

As with the extended linear counting technique previously described, the preceding embodiment of the invention extends the logarithmic counting method by replacing the bit map with an array of counts. The array of counts for extended logarithmic counting requires fewer elements than the array required for the extended linear counting method. Because the modified logarithmic counting method reduces the catalog storage requirements, it may be a preferred embodiment.

Figure 2I:
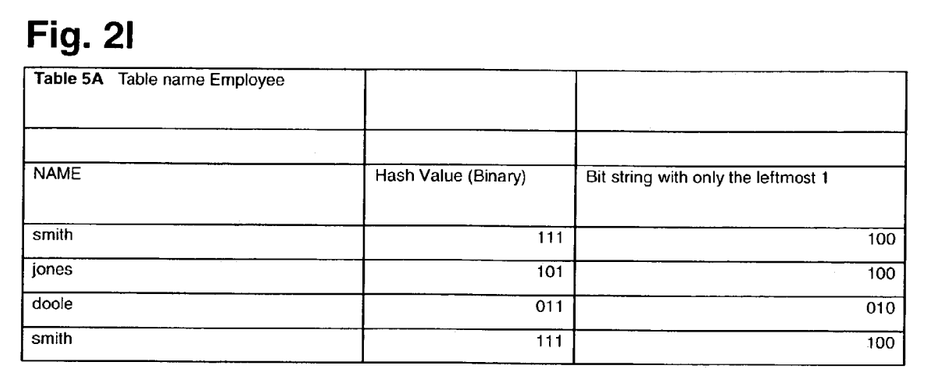

The technique may be better understood using the following examples. First, the array of counts and consequent column-cardinality estimate are computed for the NAME column in the original EMPLOYEE table in Table 1A (FIG. 2A). Then the NAME column is reproduced, along with some associated (hypothetical) hashing information as shown in Table 5A of FIG. 2I.

In Table 5A (FIG. 2I), the second column is a binary string (bit string) obtained by applying a hash function to the name in the first column. (For simplicity, we assume the hash function produces strings that are 3 bits long; in a real implementation the bit string would be much longer.) Each entry in the third column is obtained by retaining the leftmost 1 in the corresponding binary string in the second column and replacing all of the other bit values by zeroes. The array of counts is then computed by summing the number of 1's in each column of data in the third column, to yield (3,1,0).

Using the array of counts (3,1,0) obtained, the column cardinality is then estimated using $2n/q$, ("2" raised to power "n") where n is the position of the leftmost zero in the array of counts and "q" is a value of 0.7735. In this example, n=2, because counting from the leftmost end, or zero position of the array, it is the second position that has the value of zero (0 position=3, 1st position=1, 2nd position=0). The estimated column cardinality is then $2^2/0.7735=5.2$ The process described above may be repeated with "y" different hash functions (typically, y=64) to obtain "y" preliminary estimates, and a final estimate may then be computed by averaging the preliminary estimates. There may then be "y" arrays of counts maintained in the system catalog. It is well known that this technique may be implemented without actually needing y completely different hash functions. For purposes of this example, assume for simplicity that only one hash function is used. Equivalently, this example can be viewed as showing the computations necessary to compute and update a specified preliminary estimate.

Figure 2J:
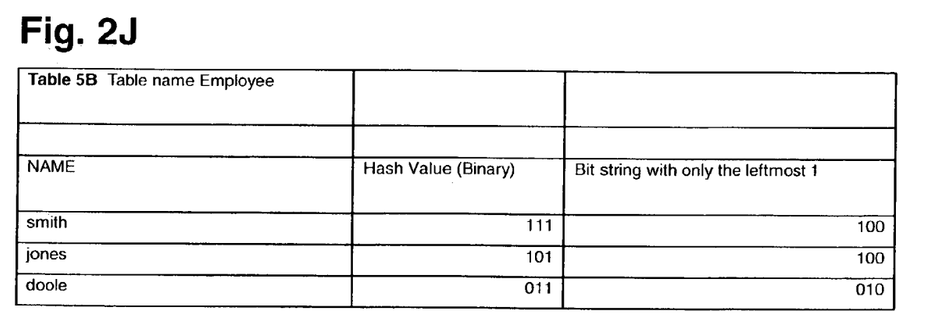

Continuing the example the last row from the original Table 1A (FIG. 2A) is removed (the entry for smith is deleted) to obtain the example shown in Table 5B of FIG. 2J. The array of counts then becomes (2,1,0) and n=2 after a simple vector subtraction, and the column cardinality estimate remains equal to 5.2(n=2 still).

Figure 2K:
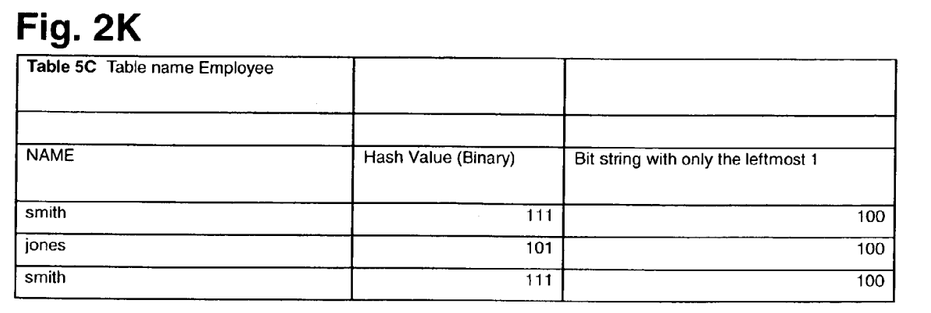

By further example, again using the original table in Table 1A (FIG. 2A) and by removing the third row to obtain the result in Table 5C (FIG. 2K), the array of counts now becomes (3,0,0). Since the position of the leftmost 0 in the array is now position 1, and n=1, the column cardinality estimate is computed to be $2^1/0.7735=2.6$.

Similar computations are used when adding a new row to the EMPLOYEE table of Table 1A (FIG. 2A).

It is conceivable that one may implement this invention as described in a database management system so that the statistics may be more current with respect to the database activities (that is INSERT, UPDATE and DELETE operations). To reduce the overhead associated with incrementally updating the statistics, a preferred approach may include buffering of INSERT, UPDATE and DELETE operations and then at a later stage generating the incremental statistics based on the buffered values. The invention may be then advantageously used because it does not need to implement a special buffering mechanism to allow incremental statistics update to proceed at a later stage. Buffering may be provided by the logged activity and almost every database system implements logging in some form to allow for recovery in the case where a database has been damaged. Database systems usually store transaction activities into a log file. The technique of this invention can be used in conjunction with the log file information to update the database cardinality statistics in an incremental fashion.

When implemented in an automatic manner, the invention may provide current cardinality estimate values at a much lower cost than automating batch-like alternatives since batch versions currently used typically require re-scanning the entire table (or a sample of the table). The invention provides incremental statistics updates while not having to rescan the entire table. The statistics may be incrementally updated during database activities if desired or may be updated at a later stage using the log file approach as described earlier. In both cases re-accessing the base table is not required. Further, a capability of calculating cardinality statistics only when needed may reduce processing requirements.

The concepts of the current invention can be further extended to a variety of applications that are clearly within the scope of this invention. Having thus described the current invention with respect to a preferred embodiment as implemented, it will be apparent to those skilled in the art that many modifications and enhancements to the current invention are possible without departing from the basic concepts as described in the preferred embodiment of the current invention. Therefore, what is intended to be protected by way of letters patent should be limited only by the scope of the following claims.

What is claimed is:

1. A method performed on a computer system for estimating a cardinality value for a set of data values, the method comprising:

(a) initializing a data structure for representing counts;
(b) obtaining a data value from said set of data values;
(c) transforming said data value into a transformed string;
(d) modifying said data structure with said transformed string;
(e) obtaining a summary statistic value from said modified data structure; and
(f) generating said estimated cardinality value using said summary statistic value, wherein generating said estimated cardinality value step (f) is performed for each distinct occurrence of a hashing function within a plurality of hashing functions, further comprising:
(f1) generating a cardinality estimate value associated with each instance of said hashing function;
(f2) summing said cardinality estimate values;
(f3) averaging said cardinality estimate values to produce a raw cardinality estimate value, and;
(f4) adjusting said raw cardinality estimate value for data value collisions to produce a final cardinality estimate value.

2. The method of claim 1, wherein said data structure is an array of counts.

3. The method of claim 1, wherein transforming said data value into a transformed string step (c) further comprises the step of:
(c1) hashing said data value into a hashed data value of said transformed string.

4. The method of claim 1 wherein transforming said data value into a transformed string step (c) further comprises the steps of:
(c1) hashing said data value into a hashed data value, and;
(c2) retaining a leftmost "1" value, all other bit values in said hashed data value being set to zero.

5. The method of claim 1 wherein modifying said data structure step (d) further comprises the steps of;
(d1) vector addition of said transformed string to said array of counts when a data value is added to said set of data values; and
(d2) vector subtraction of said transformed string from said array of counts when a data value is deleted from said set of data values.

6. The method of claim 1, wherein obtaining said summary statistic value step (e) further comprises the steps of:
(e1) determining a relative position number of a leftmost "0" within said array of counts; and
(e2) setting said relative position number to said summary statistic.

7. The method of claim 1, wherein obtaining said summary statistic value step (e) further comprises the steps of:
(e1) determining a number of non-zero positions in said array of counts; and
(e2) setting said number to said summary statistic.

8. The method of claim 1, wherein generating computing said cardinality estimate value for each distinct occurrence of a hashing function step (f1) further comprises the step of:
(f1a) computing a result of $2n/q$, wherein n is equal to said summary statistic value and q is less than one.

9. The method of claim 1, wherein said set of data values is selected from at least one of: a database file, a database log file and a flat file.

10. The method of claim 1, wherein said method is incorporated into a database management system having access to said set of data values, wherein said estimated cardinality value is used in query optimization of said database management system.

11. The method of claim 1 wherein said estimate of cardinality value is used by a query optimization component associated with a database management system.

12. The method of claim 1 wherein said array of counts is associated with a database table.

13. The method of claim 2, wherein said array of counts further comprises; a plurality of elements, each element relating to a data value whose leftmost "1" occurs at a specified element position.

14. The method of claim 2, wherein said array of counts further comprises; a plurality of elements, each element relating to a number of occurrences of a distinct data value.

15. A computer system for estimating a cardinality value for a set of data values comprising:
means for initializing a data structure for representing counts;
means for obtaining a data value from said set of data values;
means for transforming said data value into a transformed string;
means for modifying said data structure with said transformed string;
means for obtaining a summary statistic value from said modified data structure; and
means for generating said estimated cardinality value using said summary statistic value, wherein means for generating said estimated cardinality value step is performed for each distinct occurrence of a hashing function within a plurality of hashing functions, further comprising:
means for generating a cardinality estimate value associated with each instance of said hashing function;
means for summing said cardinality estimate values;
means for averaging said cardinality estimate values to produce a raw cardinality estimate value; and
means for adjusting said raw cardinality estimate value for data value collisions to produce a final cardinality estimate value.

16. The computer system of claim 15, wherein said data structure is an array of counts.

17. The computer system of claim 15, wherein said array of counts further comprises;
a plurality of elements, each element relating to a data value whose leftmost "1" occurs at a specified element position.

18. The computer system of claim 15, wherein said array of counts is further comprising;
a plurality of elements, each element relating to a number of occurrences of a distinct data value.

19. The computer system of claim 15, wherein means for transforming said data value into a transformed string further comprises:
means for hashing said data value into a hashed data value of said transformed string.

20. The computer system of claim 15, wherein means for transforming said data value into a transformed string further comprises:
means for hashing said data value into a hashed data value, and;
means for retaining a leftmost "1" value, all other bit values in said hashed data value being set to zero.

21. The computer system of claim 15 wherein said means for modifying said data structure further comprises:
means for vector addition of transformed bit string and said bit array when a data value is added to said set of data values; and means for vector subtraction of said transformed bit string from said bit array when a data value is deleted from said set of data values.

22. The computer system of claim 15, wherein means for obtaining said summary statistic value further comprises:
means for determining a relative position number of a leftmost "0" within said array of counts; and
means for setting said relative position number to said summary statistic.

23. The computer system of claim 15, wherein means for obtaining said summary statistic value further comprises:
means for determining a number of non-zero positions in said array of counts; and
means for setting said number to said summary statistic.

24. The computer system of claim 15, wherein said set of data values is selected from at least one of: a database and a flat file.

25. The computer system of claim 15, wherein said computer system is incorporated into a database management system having access to said set of data values, wherein said estimated cardinality value is used in query optimization of said database management system.

26. The computer system of claim 15 wherein said estimate of cardinality value is used by a query optimization component associated with a database management system.

27. The computer system of claim 15 configured to operate in conjunction with other computer systems in a networked environment.

28. The computer system of claim 25 wherein said networked environment is selected from a group comprising: an Intranet, an Extranet, and the Internet.

29. An article comprising:
a computer readable signal bearing medium;
means stored in the medium for initializing a data structure for representing counts;
means stored in the medium for obtaining a data value from a set of data values;
means stored in the medium for transforming said data value into a transformed string;
means stored in the medium for modifying said data structure with said transformed string;
means stored in the medium for obtaining a summary statistic value from said modified data structure; and
means stored in the medium for generating an estimated cardinality value using said summary statistic value, wherein means stored in the medium for generating said estimated cardinality value step is performed for each distinct occurrence of a hashing function within a plurality of hashing functions, further comprising:
means stored in the medium for generating a cardinality estimate value associated with each instance of said hashing function;
means stored in the medium for summing said cardinality estimate values;
means stored in the medium for averaging said cardinality estimate values to produce a raw cardinality estimate value; and
means stored in the medium for adjusting said raw cardinality estimate value for data value collisions to produce a final cardinality estimate value.

30. The article of claim 29, wherein means stored in the medium for initializing said data structure is means for initializing an array of counts.

31. The article of claim 29, wherein means stored in the medium for transforming said data value into a transformed string is further comprising:
means stored in the medium for hashing said data value into a hashed data value of said transformed string.

32. The article of claim 29, wherein means stored in the medium for transforming said data value into a transformed string is further comprising:
means stored in the medium for hashing said data value into a hashed data value, and;
means stored in the medium for retaining a leftmost "1" value, all other bit values in said hashed data value being set to zero.

33. The article of claim 29 wherein said means stored in the medium for modifying said data structure is further comprising:
means stored in the medium for vector addition of transformed bit string and said bit array when a data value is added to said set of data values; and
means stored in the medium for vector subtraction of said transformed bit string from said bit array when a data value is deleted from said set of data values.

34. The article of claim 29, wherein means stored in the medium for obtaining said summary statistic value further comprises:
means stored in the medium for determining a relative position number of a leftmost "0" within said array of counts; and
means stored in the medium for setting said relative position number to said summary statistic.

35. The article of claim 29, wherein means stored in the medium for obtaining said summary statistic value further comprises:
means stored in the medium for determining a number of non-zero positions in said array of counts; and
means stored in the medium for setting said number to said summary statistic.

36. The article of claim 29, wherein means for obtaining a data value from a set of data values is further comprising:
means in the medium for selecting said set of data values from at least one of: a database and a flat file.

37. The article of claim 29, wherein said article is incorporated into a database management system having access to said set of data values, wherein said estimated cardinality value is used in query optimization of said database management system.

38. The article of claim 29 wherein said estimate of cardinality value is used by a query optimization component associated with a database management system.

39. The article of claim 29 wherein the medium is a recordable data storage medium.

40. The article of claim 29 wherein the medium is a modulated carrier signal.

41. The article of claim 30, wherein means stored in the medium for said array of counts is further comprising;
means for relating each element of a plurality of elements of said array to a data value whose leftmost "1" occurs at a specified element position.

42. The article of claim 30, wherein means stored in the medium for said array of counts is further comprising;
means for relating each element of a plurality of elements of said array to a number of occurrences of a distinct data value.

43. The article of claim 39 wherein the medium is selected from a group comprising:
magnetic, optical, biological and atomic storage media.

44. The article of claim 40 wherein the signal is a transmission over a network selected from a group comprising:
an Intranet, an Extranet and the Internet.

45. A computer program product comprising a computer readable medium carrying program means for estimating a cardinality value for a set of data values on a computer system, the computer program product comprising:

means for initializing a data structure for representing counts;

means for obtaining a data value from said set of data values;

means for transforming said data value into a transformed string;

means for modifying said data structure with said transformed string;

means for obtaining a summary statistic value from said modified data structure; and means for generating said estimated cardinality value using said summary statistic value, wherein means for generating said estimated cardinality value step is performed for each distinct occurrence of a hashing function within a plurality of hashing functions, further comprising:

means for generating a cardinality estimate value associated with each instance of said hashing function;

means for summing said cardinality estimate values;

means for averaging said cardinality estimate values to produce a raw cardinality estimate value; and means for adjusting said raw cardinality estimate value for data value collisions to produce a final cardinality estimate value.

46. The computer program product of claim 45, wherein said data structure is an array of counts.

47. The computer program product of claim 45, wherein means for transforming said data value into a transformed string further comprises:

means for hashing said data value into a hashed data value of said transformed string.

48. The computer program product of claim 46, wherein means for transforming said data value into a transformed string further comprises:

means for hashing said data value into a hashed data value, and;

means for retaining a leftmost "1" value, all other bit values in said hashed data value being set to zero.

49. The computer program product of claim 45 wherein said means for modifying said data structure further comprises:

means for vector addition of transformed bit string and said bit array when a data value is added to said set of data values; and means for vector subtraction of said transformed bit string from said bit array when a data value is deleted from said set of data values.

50. The computer program product of claim 45, wherein means for obtaining said summary statistic value further comprises:

means for determining a relative position number of a leftmost "0" within said array of counts; and means for setting said relative position number to said summary statistic.

51. The computer program product of claim 45, wherein means for obtaining said summary statistic value further comprises:

means for determining a number of non-zero positions in said array of counts; and means for setting said number to said summary statistic.

52. The computer program product of claim 45, wherein said set of data values is selected from at least one of: a database and a flat file.

53. The computer program product of claim 45, wherein said computer system is incorporated into a database management system having access to said set of data values, wherein said estimated cardinality value is used in query optimization of said database management system.

54. The computer program product of claim 46, wherein said array of counts is further comprising;

a plurality of elements, each element relating to a number of occurrences of a distinct data value.

55. The computer program product of claim 45 configured to operate in conjunction with other computer systems in a networked environment.

56. The computer program product of claim 46, wherein said array of counts further comprises;

a plurality of elements, each element relating to a data value whose leftmost "1" occurs at a specified element position.

57. The computer program product of claim 45 wherein said estimate of cardinality value is used by a query optimization component associated with a database management system.

58. The computer program product of claim 53 wherein said networked environment is selected from a group comprising: an Intranet, an Extranet, and the Internet.

* * * * *